Figure 4:
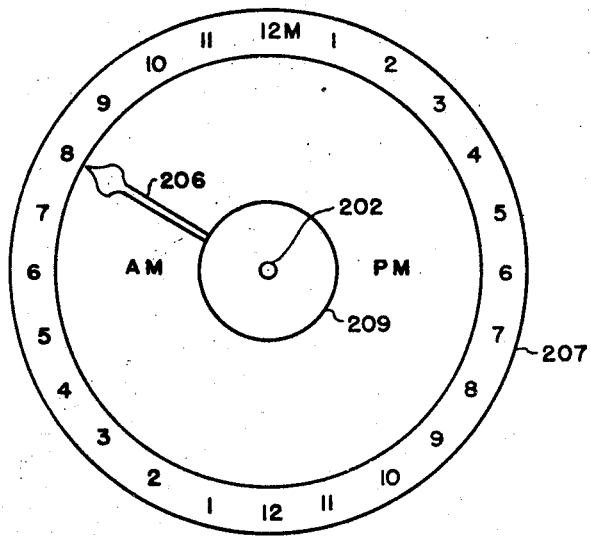

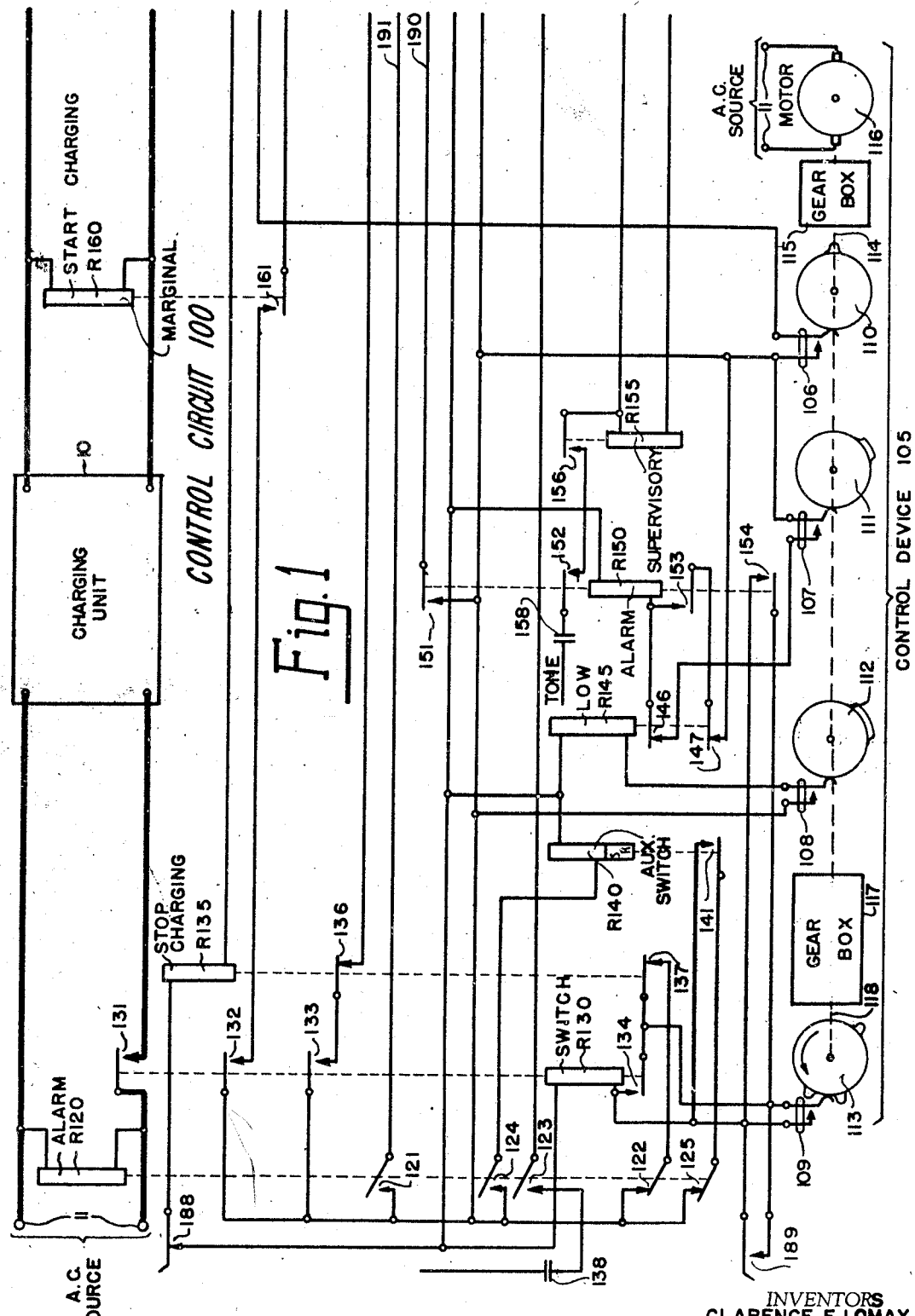

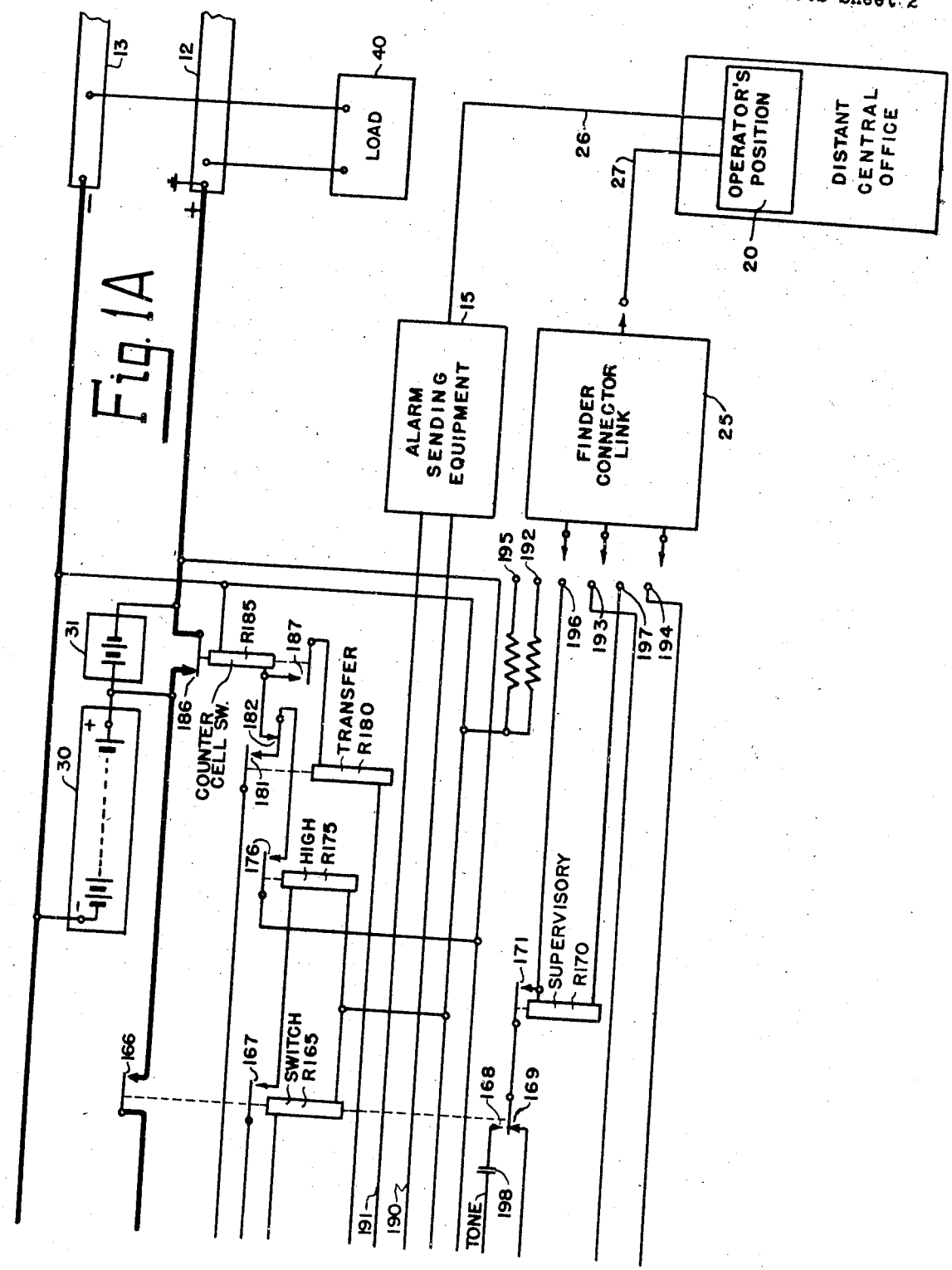

Dec. 15, 1942.  C. E. LOMAX ET AL  2,305,178
CURRENT SUPPLY SYSTEM
Filed Feb. 12, 1941   3 Sheets-Sheet 3

INVENTORS
CLARENCE E. LOMAX
PIER BAKKER
BY Davis, Lindsey, Smith & Shonts
ATTORNEYS Patented Dec. 15, 1942

2,305,178

UNITED STATES PATENT OFFICE 2,305,178

CURRENT SUPPLY SYSTEM

Clarence E. Lomax, Oak Park, and Pier Bakker, Chicago, Ill., assignors to Associated Electric Laboratories, Inc., Chicago, Ill., a corporation of Delaware Application February 12, 1941, Serial No. 378,647

17 Claims. (Cl. 171—314)

The present invention relates to current supply systems and, more particularly, to improvements in supply systems of the character utilized in automatic telephone exchanges to supply direct current to the various relays, operating magnets and other control elements of the automatic switchgear. Current supply systems conventionally used in small unattended telephone installations of this character commonly include a charging unit which functions to convert alternating current of commercial frequency into direct current of the proper voltage and to deliver this current to the load and the storage battery which are connected in parallel across the main bus conductors of the exchange. The storage battery is primarily utilized as an emergency supply source during periods of commercial power failure, although it also functions to supply current to the load during peak traffic periods when the current demand may exceed the current rating of the charging unit, and during other periods when the charging unit is not in operation.

It is an object of the present invention to provide a current supply system of the character described, wherein the converter or charging unit is periodically started and the periodicity of the charging intervals is automatically altered from time to time to conform to the load current demands on the system.

It is another object of the invention to provide a current supply system of the character described, wherein the periodicity of the charging intervals is automatically increased and decreased in a step-by-step manner to conform to increases and decreases in the load current demands which cyclically recur.

It is a further object of the invention to provide a current supply system of the character described, wherein provisions are made for resetting the automatic control equipment on a time basis following a failure of the apparatus or a failure of the alternating current source.

It is another object of the invention to provide a current supply system of the character described wherein provisions are made for automatically starting the charging unit immediately after each period of commercial power failure.

It is a further object of the invention to provide a current supply system of the character described wherein provisions are made for automatically completing the charging circuit immediately the voltage of the battery falls below a predetermined low value.

It is a still further object of the invention to provide a current supply system of the character described, which is simple in arrangement, is susceptible of complete supervision from a remote point, operates to maintain the switchboard voltage within limits satisfactory for reliable operation of the automatic switchgear, and which functions to provide improved switchboard reliability during periods of commercial power failure.

In the illustrated embodiment of the invention a system is provided which is subject to high, medium and low load current demands during three different recurrent portions of successive twenty-four hour periods. More specifically, the high load current demand starts at approximately 7 a. m., concurrently with the peak traffic period of the exchange, and continues until about 12 meridian. From this time until about 10 p. m. the exchange traffic is less so that the current demand is lowered to a medium value. Starting at approximately 10 p. m. and continuing until about 7 a. m. of the next day the exchange traffic is exceedingly light so that the current demand imposed on the system falls to a low value. This variable load current is supplied by the exchange battery and the charging unit, apparatus being provided in the system for completing the charging circuit periodically at successively lower rates of periodicity during the high, medium and low load current demand periods, respectively, of each twenty-four hour period. The control apparatus also includes means for interrupting the charging circuit each time the voltage of the exchange battery attains a predetermined value indicating that the battery is fully charged. Provisions are also made in the control apparatus for automatically completing the charging circuit immediately after each period of commercial power failure and when the voltage of the battery falls below a predetermined value; without regard to the setting of the control or time measuring device which normally controls the starting of the charging unit. In the arrangement illustrated, a fixed pattern is followed in changing the periodicity of the charging intervals. This pattern is set to conform to the set pattern of the changes in load current of the exchange, but if the operation of the control equipment is arrested the two patterns fall out of step. Accordingly, provisions are made in the system for resetting or shifting the entire charging pattern so that it may be brought into phase with the set pattern of the load current changes.

Figure 3:
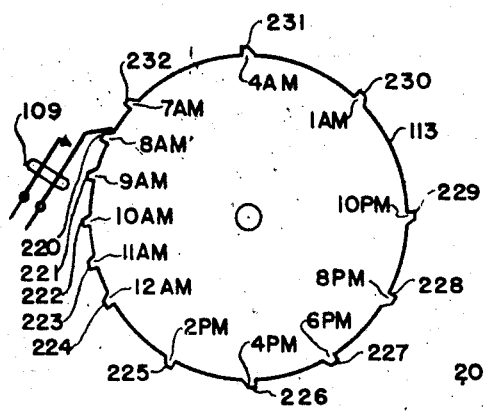
Figure 2:
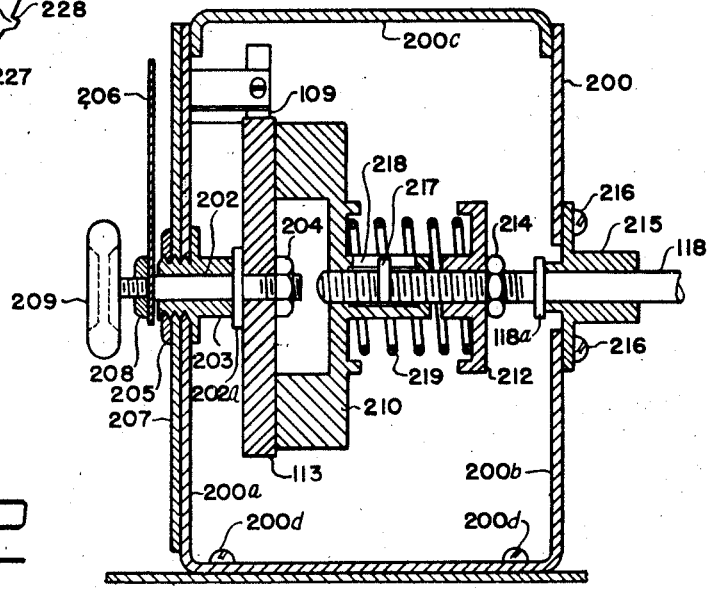

The novel features believed to be characteristic of the invention are set forth with particularity ... claims. The invention, both as
... ation and method of operation, to-
... further objects and advantages
... best be understood by reference to
... taken in connection with the
accompanying drawings in which Figs. 1 and 1A
illustrate a current supply system having incor-
porated therein the features of the invention
briefly outlined above. Fig. 2 illustrates, par-
ticularly in section, the mechanical construction of a
portion of the control device included in the
system shown in Fig. 1, and Figs. 3 and 4 are de-
tailed views of certain of the elements embodied
in the structure shown in Fig. 2.

Referring now more particularly to Figs. 1 and
1A of the drawings, the current supply system
there illustrated may be provided in a small un-
attended automatic telephone exchange located
in a community of limited population and in-
cluding trunking facilities to a distant central
office. These facilities comprise an alarm or
supervisory operator's position 20. The commu-
nity exchange may, for example, comprise switch-
ing facilities for serving two hundred lines or
more. Preferably, the switching facilities comprise
finder-connector links of the well-known Strow-
ger type. In order to facilitate a description of
the mode of operation of the illustrated current
supply system, a portion of the switching equip-
ment provided in the community exchange has
been illustrated in diagrammatic form. This
equipment includes a finder-connector link 25
and alarm sending equipment 15 which termi-
nates on alarm trunk 20 extending to the opera-
tor's position 20 in the distant central office.
Through the equipment provided at this position
the operator has access over a trunk 27 to the
automatic switching equipment of the commu-
nity exchange. For purposes of explanation it
may be assumed that the load current demands
of the switchgear provided in the community ex-
change follow the pattern briefly outlined in the
... introductory portion of the specifica-
tion.

... current demands are supplied by the
... current supply system. In brief, this
system comprises a constant current rectifier or
charging unit 10 which is arranged to deliver
direct current to a load 40 and also functions to
charge the system battery 30. This charging
unit may comprise a motor generator set or may
be a static rectifier of the thermionic or dry disk
type. Alternating current is supplied to the in-
put terminals of the charging unit 10 over a 110
volt alternating current feeder circuit which ex-
tends to the current supply terminals 11. The
storage battery 30 is normally connected across
the system bus conductors 12 and 13 from which
... circuits extend to the component control
devices constituting the load 40. In accord-
ance with well-established telephone engineering
practice the positive bus conductor 12 is con-
nected to ground. It will be understood that the
load ... is comprised of a large number of relay
and magnet windings, lamps and other control
devices, but for convenience in explaining the
... of the system these elements may be
... together and considered as a load of var-
ying resistance. The battery 30 is of the type
commonly used in telephone exchanges and
may comprise, for example, twenty-four series-
connected cells having a capacity of 100 ampere
hours or more. In order to stabilize the system
voltage during periods when the charging unit
... is connected to deliver current to the battery 30 and the load 40 in parallel, a source of counter
E. M. F. in the form of a pair of series-connected
counter cells 31, each having a voltage of ap-
proximately 2 volts, is provided.

For the purpose of controlling the charging cir-
cuit and the inclusion of the counter cells 31 in
the current supply circuit, a control circuit 100
is provided. Briefly described, this control cir-
cuit comprises an alarm relay R120, a switching
relay R130, a stop charging relay R135, an aux-
iliary switching relay R140, a low voltage test
relay R145, an alarm relay R150, a supervisory
relay R155, a start charging relay R160, a switch-
ing relay R165, a supervisory test relay R170, a
high voltage test relay R175, a transfer relay
R180 and a counter cell switching relay R185.
The control circuit also includes an equalizing
charge control key 188 of the well-known lock-
ing type and a start charging key 189 of the well-
known non-locking type.

For the purpose of controlling the circuit 100
a control device 105 of the cam-operated motor-
driven type is provided. This device comprises a
plurality of cams 110, 111 and 112 which are
mounted for rotation on a shaft 114 and are
driven through a speed-reducing gear box 115 by
an alternating current motor 116. The driving
motor 116 is normally energized from the alter-
nating current feeder circuit extending to the
terminals 11. The control device 105 also in-
cludes a fourth cam 113 which is arranged to be
driven from the shaft 114 through a speed-re-
ducing gear box 117 by a shaft 118.

As best shown in Figs. 2, 3 and 4 of the draw-
ings, the cam 113 is mounted for rotation with
a shaft 202 and is driven from the shaft 118
through a spring-biased friction clutch arrange-
ment. More specifically, this portion of the con-
trol device 105 comprises a housing 200 having
upstanding end walls 200a and 200b and a de-
tachable cover 200c. The housing may be se-
cured to the base structure of the device by
means of screws 200d. The stub shaft 202, which
carries the cam 113, is journaled in a bearing
member 203 which is secured to the end wall 200a
by means of an assembly nut 205. The end of
the shaft 202 which projects outside the housing
200 is provided with an undercut threaded por-
tion to which is secured a pointer 206 by means
of an assembly nut 208. In order to adjust the
angular position of the cam 113 relative to the
angular position of the shaft 118 a knob 209 is
provided which is secured to the threaded ex-
tremity of the shaft 202. The shaft has formed
integral therewith a shoulder 202a which forms
a stop against which the cam 113 is clamped by
means of an assembly nut 204. The shoulder
202a is also provided with a bearing surface
which abuts the adjacent end surface of the
bearing member 203, and, in cooperation there-
with, absorbs the end thrust on the cam 113.
The driving shaft 118 of the mechanism is jour-
naled in a bearing member 215 which is secured
to the end wall 200b of the casing 200 by means
of screws 216. This bearing member is provided
with an end bearing surface which abuts the ad-
jacent bearing surface of the shoulder 118a
formed integrally with the shaft 118. The
clutching mechanism referred to above comprises
a recessed clutch plate 210 which is secured to
the shaft 118 by means of a key and slot con-
nection comprising the key 217 driven into a
drill hole provided in the shaft and a slot 218
formed in the shank portion of the clutch mem-
ber 210. This pin and slot connection permits axial movement of the clutch member 210 along the shaft 118 without allowing relative rotary movement therebetween. The clutch member 210 is provided with a clutch face which bears against the adjacent surface of the cam 113 so that a slip connection is provided between these two elements to permit adjustment of the relative angular positions thereof. In order to maintain the clutching member 210 in engagement with the cam 113 a biasing spring 219 is provided, the left end of which bears against the clutch member 210 and the right end of which is anchored within a collar 212. This collar is secured to the threaded portion of the shaft 118 and is held in place by means of a locknut 214.

In the normal operation of the control device 105 the shaft 114 and the cams carried thereby are rotated at a speed of six revolutions per minute, whereas the cam 113 is driven through the clutching arrangement just described by the shaft 118 at a speed of one revolution for each 24-hour period. In order to at all times indicate the position of the cam 113, an indicia bearing plate 207 is provided which is clamped between the outer side of the end wall 200a and the assembly nut 205. This plate has inscribed around the periphery thereof the numerals of a twenty-four hour clockface.

The motor driven cams 110, 111, 112 and 113 have associated therewith contact springs 106, 107, 108 and 109, respectively, which are provided to perform the control operations described with particularity hereinafter. It is noted that the three cams 110, 111 and 112 are individually equipped with cam projections which bear a pre-determined angular relationship with respect to each other. The cam 113, on the other hand, which is actuated on a time basis, is provided with thirteen cam projections which are numbered from 220 to 232, inclusive. Each of these projections is operative to move the contact springs 109 into engagement when it engages the cam-follower portion of the associated contact spring. In order to insure accurate time control of the control circuit 100, the control device 105 is preferably driven by a motor 116 of the constant speed or synchronous type.

In considering the operation of the system it may be assumed that the voltage of the storage battery 30 is approximately 50 volts; the high voltage test relay R175 is constructed and adjusted to operate when energized by a voltage exceeding 52 volts; the low voltage test relay R145 is constructed and adjusted to operate on any voltage exceeding 46 volts and that the time, as indicated by the pointer 206 and as it actually exists, is 7 a. m. At this time the projection 220 carried by the cam 113 engages the cam-follower portion of the associated contact spring 109 to move these contact springs into engagement and thus complete a circuit including the contacts 122 and 137 for energizing the switching relay R130. In operating, the relay R130 closes its contacts 134 to complete a locking circuit for itself which extends from the positive bus conductor 12 by way of the contacts 122, 137 and 134 and the winding of R130 to the negative bus conductor 13. With this circuit completed the relay R130 is held operated after the contact springs 109 are disengaged under the control of the cam projection 220. At its contacts 133, the relay R130 prepares a circuit for energizing the transfer relay R180 in series with the counter cell switching relay R185. At its contacts 132 the relay R130 prepares the operating circuit for the switching relay R165. At its contacts 131 the relay R130 completes the input circuit of the charging unit 10, whereby alternating current is delivered to this unit from the feeder circuit which is connected to the terminals 11. After the operation of the charging unit 10 is thus initiated, the voltage across the output terminals thereof rises to a value slightly exceeding the voltage of the battery 30, at which time the marginal voltage testing relay R160 operates. In operating, the relay R160 closes its contacts 161 to complete the prepared operating circuit for the switching relay R165, this circuit extending from the positive conductor 12 by way of the contacts 132 and 161 and the winding of R165 to the negative conductor 13. The relay R165, in operating, closes its contacts 166 to connect the output terminals of the charging unit 10 across the load 40 and the storage battery 30 in parallel. Thus the charging unit is connected to deliver current to the load 40 and also to the battery 30, in the event the load current demand does not exceed the constant current rating of the unit. At its contacts 167, the relay R165 prepares a high voltage test circuit over which the winding of the high voltage test relay R175 is periodically bridged across the bus conductors 12 and 13 under the control of the cam 110. At its contacts 168, the relay R165 prepares one of the supervisory signaling circuits described with particularity hereinafter.

After the operation of the charging unit 10 is initiated in the manner just explained, the voltage across the bus conductors 12 and 13 will ultimately start to rise as a consequence of the increased charge of the battery 30. When the voltage across these conductors rises to a value exceeding 52 volts the high voltage test relay R175, in cooperation with the transfer relay R180 and the counter cell switching relay R185, functions to include the counter cells 31 in the connection between the positive terminal of the battery and the bus conductor 12. More specifically, when the voltage across the conductors 12 and 13 exceeds 52 volts the high voltage test relay R175 is sufficiently energized in the above-mentioned high voltage test circuit to operate. This test circuit may be traced as extending from the positive conductor 12 by way of the periodically engaged contact springs 106, the contacts 167 and the winding of R175 to the negative conductor 13. In operating, the relay R175 closes its contacts 176 to complete a circuit including the contacts 182 for energizing the counter cell switching relay R185. The relay R185 now operates and closes its contacts 187 to complete a path, including the contacts 182, 176, 136 and 133, and the contact springs 106 for short-circuiting the winding of the transfer relay R180. This short-circuiting path is interrupted at the contact springs 106 at the expiration of the high voltage test period in progress, thus permitting the two relays R180 and R185 to be energized in series over a circuit which extends from the positive conductor 12 by way of the contacts 133 and 136, the winding of R180, the contacts 187 and the winding of R185 to the negative conductor 13. In operating, the relay R185 also opens its contacts 186 to interrupt the path normally short-circuiting the counter cells 31. Thus the indicated counter cells are serially included in the connection between the positive terminal of the battery 30 and the positive bus conductor 12, whereby the voltage across the conductors 12 and 13 is decreased to a value approximately 4 volts less than the voltage across the terminals of the storage battery 30. In other words, the system voltage is lowered to a value of approximately 48 volts although the battery voltage is approximately 52 volts. After the system voltage is thus lowered the high voltage test relay R175 fails to operate when energized in the periodically completed high voltage test circuit, until the system voltage is again increased to a value exceeding 52 volts. The transfer relay R180, upon operating, closes its contacts 181 to prepare the operating circuit for the stop charging relay R135. At its contacts 182, the relay R180 further interrupts the above-traced operating circuit for the counter cell switching relay R185.

As the charging unit 10 continues to deliver charging current to the battery 30 the voltage across the terminals of this battery rises until it exceeds a value of 56 volts, at which time the voltage across the bus conductors 12 and 13 again exceeds 52 volts. When this occurs, the high voltage test relay R175 operates during the next ensuing high voltage test period and closes its contacts 176 to complete the prepared operating circuit for the stop charging relay R135. This circuit extends from the positive conductor 12 by way of the contacts 176 and 181, the winding of R135 and the contacts of the equalizing charge control key 188 to the negative conductor 13. When thus energized the relay R135 operates and opens its contacts 136 to interrupt the above-traced series locking circuit for the two relays R180 and R185. At its contacts 137, the relay R135 interrupts the above-traced locking circuit for the switching relay R130. Thus the three relays R130, R180 and R185 are deenergized and restore. Substantially concurrently with the release of these three relays the high voltage test period in progress is terminated by the cam 110 to cause the deenergization and release of the high voltage test relay R175. The two relays R175 and R180, in restoring, interrupt the operating circuit for the stop charging relay R135, causing the latter relay to restore. The relay R185, upon restoring, opens its contacts 187 further to interrupt the circuit for energizing the relay R130, and closes its contacts 188 to again short-circuit the counter cells 31 and thus equalize the battery voltage and the voltage across the bus conductors 12 and 13. The switching relay R130, in restoring, opens its contacts 131 to interrupt the input circuit to the charging unit 10. At its contacts 132, the relay R130 interrupts the operating circuit for the switching relay R185. The relay R185 now restores to disconnect the output terminals of the charging unit 10 from the terminals of the storage battery 30. Thus the charging circuit is interrupted and the load current is supplied solely by the storage battery 30. At its contacts 167, the relay R175 interrupts the high voltage test circuit to prevent further operation of the high voltage test relay R175 until the operation of the charging unit 10 is again initiated.

During the peak traffic period of the exchange, which extends from 7 a. m. to 12 meridian, the charging circuit is completed through operation of the switching relays R130 and R185 at hourly intervals. Thus it will be apparent, from a consideration of Fig. 3 of the drawings, that the contact springs 109 are moved into engagement at 8:00 a. m., 9:00 a. m., 10:00 a. m., 11:00 a. m., and 12:00 a. m. by the cam projections 220, 221, 222, 223 and 224, respectively. Each time the contact springs 109 are engaged the switching relay R130 operates to initiate the operation of the charging unit 10 in the manner explained above. Preferably, the constant current rating of the charging unit 10 is such that the battery 30 is fully charged, even during the peak traffic period of high current demand, in less than one hour. If a charging unit of this character is used in the system, the high voltage test relay R175 will, in the normal operation of the system, first operate to cause the countercells 31 to be included in the positive connection between the battery 30 and the conductor 12 and then operate to cause the interruption of the charging circuit in less than an hour's time. Accordingly it will be understood that operation of the charging unit 10 is initiated and then arrested six times during the peak traffic period of the exchange when a heavy load is imposed upon the current supply system. It will also be understood that if the current demand is excessive during any given hourly interval, the storage battery 30 may be insufficiently charged during the interval to produce a rise in the system voltage sufficient to cause the high voltage test relay R175 to operate and cause the interruption of the charging circuit. If this should occur the switching relay R130 will, of course, remain in its operated position so that the engagement of the contact springs 109 under the control of the cam 113 will be without effect.

Starting at 12 m. and continuing through until 10 p. m., the switching relay R130 is energized and operates to initiate the operation of the charging unit 10 at intervals of two hours. From 10 p. m. until 7 a. m. the operation of the charging unit 10 is initiated under the control of the switching relay R130 at three-hour intervals. Thus it will be observed, by reference to Fig. 3 of the drawings, that the cam projections 224 to 229, inclusive, are spaced apart by distances substantially twice as great as the spacing between the cam projections 220 to 224, inclusive, and that the spacing between the projections 229 to 232, inclusive, is approximately three times the spacing between the cam projections 220 to 224, inclusive. It will be understood, therefore, that the projection 225 operates to close the contact springs 109 at 2 a. m., the projection 226 operates to close the contact springs 109 at 4 a. m., and so on. Each time these contact springs are closed the switching relay R130 functions to initiate the operation of the charging unit 10. Normally the operation of this unit will be arrested under the control of the high voltage test relay R175 before the contact springs 109 are again closed.

It is well known that batteries cannot be constructed so that all cells receive the proper amount of charge during regular daily charging cycles, when incorporated in an installation of the character under consideration. The most convenient method of building up the charge on lagging cells is that of giving the entire battery an equalizing or overcharge. The accepted method of accomplishing this in telephone exchanges is to overcharge the exchange battery periodically, preferably at thirty-day intervals. If the equalizing charge is omitted from the system maintenance the exchange battery will become undercharged and cannot carry the desired load. Moreover, a short battery life will result. Conversely, if the daily charging cycles are sufficiently high to prevent the charge on certain of the battery cells from lagging, the battery as a whole will be constantly overcharged, resulting in a short life. In equalizing the cell charge of the usual telephone battery from a constant current source the voltage at which the charge may be stopped, with assurance that all cells are fully charged, ranges from 2.25 to 2.9 volts per cell, depending upon the charging rate, the temperature of the battery, and other factors. In the arrangement illustrated the two keys 188 and 189 are provided to facilitate the starting of the equalizing charge. Thus when it is desired to subject the battery 30 to an equalizing charge a maintenance man visits the community exchange and operates the locking key 188 to its off-normal position, thereby to open the previously traced operating circuit for the stop charging relay R135. If the charging unit is not in operation at the time the key 188 is actuated, the maintenance man may momentarily operate the key 189 to its off-normal position, thereby to complete an obvious alternative circuit for energizing the switching relay R130. This relay, in operating, locks up and initiates the operation of the charging unit 10 in the exact manner previously described. It will be observed that with the contacts of the key 188 disengaged, the stop charging relay R135 is rendered ineffective to arrest the operation of the charging unit. Aside from this alteration of the system the relay operations previously described may occur. Thus, the relay R185 is free to operate under the control of the high voltage test relay R175 to include the countercells 31 in the positive connection between the battery and the bus conductor 13, thereby to lower the system voltage. Following the operation of the relay R185 and the transfer relay R180, any subsequent operation of the high voltage test relay R175 is without effect. When the key 188 is released, however, the high voltage test relay R175 is again rendered operative to complete the circuit for energizing the stop charging relay R135, whereby the operation of the charging unit 10 is arrested.

In subjecting the battery 30 to an equalizing charge in the manner pointed out above, the charge is preferably started at about 12 m. of a working day. Based on traffic studies, the charger should, when started at this time, more than carry the load during the afternoon and evening of the same day. From about 10 p. m. until midnight the battery will receive a charge of from 33% to 66% of the constant current rating of the charging unit 10. From midnight until 6 a. m. of the following day the battery will receive even more charging current. At about 6 a. m. the exchange load should start to increase, thus again reducing the charging rate effectively to taper the equalizing charge. If the maintenance man who starts the equalizing charge revisits the exchange to stop the charge at 8 a. m., for example, a lower charging rate will thus be utilized during the last two hours of the equalizing charge. This decrease in the rate of charge at the end of the equalizing charge tends to avoid an unduly high battery voltage after the charge is terminated.

If, for any reason, the system voltage drops below 46 volts the two relays R145 and R150 function to start the charging unit and to impart a setting to the associated supervisory signaling circuits, wherein these circuits are conditioned to transmit a signal to a distant supervisory operator's position indicative of the low voltage condition. In this regard it will be noted that during each revolution of the cams 110, 111 and 112, the low voltage test relay R145 is energized in a circuit including the contact springs 108 under the control of the cam 112. So long as the system voltage exceeds 46 volts the relay R145 operates when this circuit is completed. In operating, the relay R145 opens its contacts 146 to prevent the operation of the relay R150 during the last half of the low voltage test period in progress. When, however, the system voltage drops below 46 volts the low voltage test relay R145 is insufficiently energized to operate. In such case the relay R150 is energized in a circuit including the contacts 146 and the contact springs 107 under the control of the cam 111, during the last half of the low voltage test period in progress. When thus energized the relay R150 locks up in a circuit including the contacts 153 and 147, and closes its contacts 154 to complete a circuit for energizing the switching relay R130 independently of the position of the cam 113. The operation of the charging unit 10 is thus initiated in the exact manner pointed out above. At its contacts 152, the relay R150 prepares a supervisory signaling circuit over which a distinctive tone signal indicative of the low voltage condition of the system may be transmitted to the distant supervisory operator's position. At its contacts 151, the relay R150 completes an obvious path for impressing ground potential upon the alarm lead 190, whereby the alarm sending equipment 15 operates to transmit a signal over the trunk 26 to the operator's position 20 in a manner well understood in the art. In the usual arrangement, this signal takes the form of an illuminated signal lamp and the operator, upon observing the lighted condition of the lamp, is informed that trouble is present in the distant community exchange.

After the operation of the charging unit 10 is initiated under the control of the low voltage test relay R145, in the manner pointed out above, the system voltage should immediately rise to a value exceeding 46 volts. Upon observing the energized condition of the low voltage signal lamp the operator attending the position 20 may seize one of the links provided in the distant community exchange and dial the test number assigned to the test contacts 192, 193 and 194. Assuming that the finder-connector link 25 is seized, the usual dial tone signal is transmitted therefrom over the trunk 27 to the headset of the operator attending the position 20 when the finder portion of the link switches the calling trunk 27 through to the connector portion of the link. Upon receiving the dial tone signal the operator may cause the wipers of the connector switch in the link 25 to be positioned on the test contacts 192 to 194, inclusive, by dialing the directory number assigned to this contact set. After the test contacts are thus selected the usual line busy test occurs in the control equipment of the link. If the test contacts are idle the usual switch-through operation occurs in the link 25, whereby ground potential is impressed upon the private contact 192 to guard this contact set against seizure, and a circuit including the positive and negative line wipers of the connector switch and the winding of the supervisory relay R155 is completed for energizing the ring cut-off relay conventionally embodied in the connector portion of the link. When thus energized the ring cut-off relay operates to establish a signaling circuit which extends from the headset in use at the operator's position 20 over the trunk 27 and through the link 25 to the selected test contacts. The supervisory relay R155 also operates when energized in this circuit, and closes its contacts 156 to complete a circuit for transmitting a signal through the link 25 and over the trunk 27 which is indicative of the low voltage condition of the current supply system. This signaling circuit may partially be traced as extending from the ungrounded terminal of a tone generator, not shown, by way of the condenser 158, the contacts 152 and 156, and the line contact 193 to the negative line wiper of the connector switch. From this point the signal current is transmitted through the link 25 and over the trunk 27 to energize the receiver of the headset in use at the operator's position 20. The signal produced serves to inform the operator of the low voltage condition of the current supply system.

Normally the system voltage, i. e., the voltage across the conductors 12 and 13, should rise to a value exceeding 46 volts shortly after the operation of the charging unit 10 is initiated under the control of the relay R150, in the manner just explained. When the system voltage is thus increased, the periodic operation of the low voltage test relay R145 to prevent the operation of the relay R150 during the low voltage test periods is resumed. Accordingly the relay R150 is deenergized and restores to interrupt the above-traced signaling circuit and thus terminate the signal being transmitted to the operator's position 20. In releasing, the relay R150 also opens its contacts 151 to disconnect the alarm lead 190 from ground, whereby the operated portion of the alarm sending equipment 15 is released and the low voltage signal lamp provided at the operator's position 20 is deenergized. The operator is thus informed that the voltage of the current supply system provided in the distant community exchange has been restored to normal. After this information is received the operator attending the position 20 may release the trunk 27, the link 25 and, incident thereto, the supervisory relay R155, all in a manner well understood in the art. If desired, the operator attending this position may make periodic test calls of the character just described to ascertain whether or not the low voltage condition is corrected within a reasonable time interval, instead of camping on the test connection initially set up to the set of test contacts including the contacts 192 to 194, inclusive. It will be understood from the above explanation that after the operation of the charging unit 10 is initiated under the control of the relay R150 due to a low voltage condition of the system the operation of this unit continues until arrested under the control of the high voltage test relay R175, in the manner explained above.

Provisions are made in the system for transmitting an emergency alarm signal to the operator's position 20, for example, in the event the alternating current source fails. Thus if the feeder circuit extending to the terminals 11 is interrupted or otherwise deenergized, the normally energized alarm relay R120 restores. In releasing, the relay R120 closes its contacts 121 to complete an obvious path for impressing ground potential upon the alarm lead 191, whereby the alarm sending equipment 15 operates to transmit a signal over the trunk 26 which indicates to the operator attending the position 20 that a fault is present in the distant community exchange. In the usual arrangement this signal is of the visual type. More specifically, an alarm signal lamp provided at the operator's position 20, and individual to the community exchange, is energized under the control of the alarm sending equipment 15 when the alarm lead 191 is connected to ground. At its contacts 122, the relay R120 opens the above-traced operating circuit for the switching relay R130, whereby the relays R130, R165, R175, R180, R185 and R135, or any operated ones thereof, are deenergized and restore. At its contacts 123, the relay R120 prepares another of the supervisory signaling circuits. At its contacts 124, the relay R120 completes an obvious circuit for energizing the slow-to-release auxiliary switching relay R140. At its contacts 125, the relay R120 opens a point in an auxiliary operating circuit for the switching relay R130. The relay R140, upon operating, closes its contacts 141 to prepare the auxiliary operating circuit for the switching relay R130. From the above explanation it will be apparent that the alarm relay R120, upon restoring, immediately deenergizes any of the relays R130, R135, R165, R170, R180 and R185 which may be operated at the time the commercial power failure occurs. Thus the current drain on the storage battery 30 is reduced.

When an alarm signal is transmitted to the operator's position 20 in the manner explained above, the operator attending this position may route a test connection to the test contacts 195, 196 and 197, whereby the supervisory relay R170 is energized and a signaling circuit is established between this relay and the operator's position 20, all in the manner explained above with reference to the test call routed to the supervisory relay R155. In this case the signaling circuit is completed in response to operation of the supervisory relay R170 and extends from one terminal of a tone current source, not shown, by way of the condenser 138, the contacts 123, 169 and 171, the line contact 196 and the negative line wiper of the connector switch. From this point the signaling current is transmitted over the established connection to energize the receiver of the headset in use at the operator's position 20. The character of the signal thus produced serves to inform the operator that a commercial power failure has occurred in the distant community exchange. By repeating the test calls at regular intervals the operator may ascertain when the fault is corrected, it being noted in this regard that when the alternating current feeder circuit extending to the terminals 11 is again energized the alarm relay R120 immediately operates and opens its contacts 123 to interrupt the signaling circuit. After the alarm signal is thus terminated, the operator may release the test connection in the usual manner.

In reoperating, the alarm relay R120 also opens its contacts 121 to disconnect the alarm lead 191 from ground, whereby the operated portion of the alarm sending equipment 15 is released and the alarm signal lamp at the operator's position 20 is deenergized. At its contacts 122, the relay R120 prepares the initially traced operating circuit for the switching relay R130. At its contacts 124, the relay R120 interrupts the prepared operating circuit for the auxiliary switching relay R140. At its contacts 125, the relay R120 completes the prepared auxiliary operating circuit for the switching relay R130, this circuit extending from the positive conductor 12 by way of the contacts 125 and 141, and the winding of R130 to the negative conductor 13. When thus energized the relay R130 operates, locks up, and initiates the operation of the charging unit 10, all in the manner previously explained. Shortly following the operation of the switching relay R130 the slow-to-release auxiliary switching relay R140 restores and opens its contacts 141 to interrupt the auxiliary operating circuit for the relay R130. Thus the normal operation of the current supply system is resumed. In this regard it will be noted that when operation of the charging unit 10 is initiated, following the reoperation of the alarm relay R120, the switching relay R165 operates to prepare an auxiliary supervisory signaling circuit. Accordingly if the operator attending the position 20 routes a test call to the supervisory relay R170, a signal derived from a different signal current source and transmitted through the condenser 198 and the contacts 168 and 171 to the established connection is reproduced by the headset in use at the operator's position 20. The reproduction of this current serves to inform the operator that the charging unit 10 is in operation. It will also be understood that this signal is received by the operator during routine test calls in all cases where a test call is initiated during an interval when the charging unit 10 is in operation. On the other hand, if a test connection is set up to the supervisory relay R170 during an interval when the charging unit 10 is not operating, and the alternating current feeder circuit is energized, no signal will be transmitted to the operator's position 20 over the established connection.

Since current for energizing the driving motor 116 of the control device 105 is also derived over the feeder circuit extending to the current supply terminals 11, it will be understood that during each period of commercial power failure the operation of this motor is arrested. It will also be understood that when the feeder circuit is subsequently energized the operation of the motor 116 is resumed. When the motor 116 is deenergized, the pattern of the charging intervals falls out of step with the load current pattern of the exchange. Thus if the operation of the motor and the cams driven thereby is arrested for a period of two hours, and the setting of the cam 113 is not corrected after operation of the motor is resumed, the cam projection 232, for example, will close the contact springs 109 approximately two hours after the peak traffic or high current demand period of the exchange occurs. Accordingly it is necessary, with the arrangement illustrated, that the cam 113 be reset after each period of commercial power failure. To this end the knob 209 may be actuated to rotate the cam 113 relative to the driving shaft 118 until the pointer 206 is indexed with the numeral indicating the correct time. Such relative movement is possible because of the slip connection between the clutching member 210 and the cam 113. When the cam 113 is thus reset the periodic closure of the contact springs 109 is again synchronized with the recurrent changes in the system load.

As an alternative to the arrangement for resetting the cam 113 following each period of commercial power failure, an inverter may be provided which is normally inactive, but which is energized in response to the release of the alarm relay R120. This inverter may be connected to change direct current, derived from the storage battery 30, into alternating current and to deliver the alternating current to the motor 116 for the purpose of sustaining the operation of this motor and control device 105 during the period when the alternating current feeder circuit is deenergized. If such an arrangement is used it becomes unnecessary to reset the cam 113 after each period of commercial power failure. In all cases, however, it is desirable to provide the mechanism shown in Fig. 2, whereby the cam 113 may be reset from time to time in order to correct minor inaccuracies in the time setting thereof. The manner in which an inverter of the character just described may be incorporated in the system shown in Figs. 1 and 1A is disclosed and claimed in co-pending application Serial No. 378,646, filed February 12, 1941, C. E. Lomax and Pier Bakker.

While there has been described what is at present considered to be the preferred embodiment of the invention, it will be understood that various modifications may be made therein, and it is contemplated to cover in the appended claims all such modifications as fall within the true spirit and scope of the invention.

What is claimed is:

1. In a current supply system which is subject to different load current demands during different recurrent portions of successive predetermined periods, a storage battery for supplying at least a portion of the load current, a charging circuit for said battery, and means for periodically completing said circuit at different rates of periodicity for the different portions of each predetermined period.

2. In a current supply system which is subject to different load current demands during different recurrent portions of successive predetermined periods, a storage battery for supplying at least a portion of the load current, a charging circuit for said battery, means for periodically completing said circuit at different rates of periodicity for the different portions of each predetermined period, and means for interrupting said circuit each time the voltage of said battery attains a predetermined value.

3. In a current supply system which is subject to high, medium and low load current demands during three different recurrent portions of successive twenty-four hour periods, a storage battery for supplying at least a portion of the load current, a charging circuit for said battery, and means for completing said circuit periodically at successively lower rates of periodicity during the high, medium and low load current demand portions, respectively, of each twenty-four hour period.

4. In a current supply system which is subject to high, medium and low load current demands during three different recurrent portions of successive twenty-four hour periods, a storage battery for supplying at least a portion of the load current, a charging circuit for said battery, means for completing said circuit periodically at successively lower rates of periodicity during the high, medium and low load current demand portions, respectively, of each twenty-four hour period, and means for interrupting said circuit each time the voltage of said battery attains a predetermined value.

5. In a current supply system which is subject to different load current demands during different recurrent portions of successive predetermined periods, a storage battery for supplying at least a portion of the load current, a charging circuit for said battery, a circuit for testing the voltage of said battery, a cyclically operating control device operative through one complete cycle during each of said predetermined periods, means controlled by said device for periodically completing said charging circuit at different rates of periodicity for the different portions of each predetermined period, means controlled by said device for periodically completing said test circuit at a substantially higher rate of periodicity, and a testing device controlled over said test circuit and operative to cause the interruption of said charging circuit each time the voltage of said battery attains a predetermined value.

6. In a current supply system which is subject to high, medium and low load current demands during three different recurrent portions of successive twenty-four hour periods, a storage battery for supplying at least a portion of the load current, a charging circuit for said battery, a circuit for testing the voltage of said battery, a cyclically operating control device operative through one complete cycle during each of said twenty-four hour periods, means controlled by said device for completing said charging circuit periodically at successively lower rates of periodicity during the high, medium and low load current demand portions of each twenty-four hour period, means controlled by said device for periodically completing said test circuit at a substantially higher rate of periodicity, and a testing device controlled over said test circuit and operative to cause the interruption of said charging circuit each time the voltage of said battery attains a predetermined value.

7. In a current supply system which is subject to different load current demands during different recurrent portions of successive predetermined periods, a storage battry, a connection for supplying current to the load from said battery, a charging circuit for said battery, a circuit for testing the voltage of said battery, said test circuit including a relay which is operative only when the voltage impressed on said test circuit attains a predetermined value, a cyclically operating control device operative through one complete cycle during each of said predetermined periods, means controlled by said device for periodically completing said charging circuit at different rates of periodicity for the different portions of each predetermined period, means controlled by said device for periodically completing said test circuit at a substantially higher rate of periodicity, a source of counter E. M. F., and means responsive to operation of said relay for including said source in said connection.

8. In a current supply system which is subject to different load current demands during different recurrent portions of successive predetermined periods, a storage battery, a connection for supplying current to the load from said battery, a charging circuit for said battery, a circuit for testing the voltage of said battery, said test circuit including a relay which is operative only when the voltage impressed on said test circuit attains a predetermined value, a cyclically operating control device operative through one complete cycle during each of said predetermined periods, means controlled by said device for periodically completing said charging circuit at different rates of periodicity for the different portions of each predetermined period, means controlled by said device for periodically completing said test circuit at a substantially higher rate of periodicity, a source of counter E. M. F., and means responsive to successive operations of said relay for alternately including said source in said connection and interrupting said charging circuit.

9. In a current supply system which is subject to high, medium and low load current demands during three different recurrent portions of successive twenty-four hour periods, a storage battery, a connection for supplying current to the load from said battery, a charging circuit for said battery, a circuit for testing the voltage of said battery, said test circuit including a relay which is operative only when the voltage impressed on said test circuit attains a predetermined value, a cyclically operating control device operative through one complete cycle during each of said twenty-four hour periods, means controlled by said device for completing said charging circuit periodically at successively lower rates of periodicity during the high, medium and low load current demand periods, respectively, of each twenty-four hour period, means controlled by said device for periodically completing said test circuit at a substantially higher rate of periodicity, a source of counter E. M. F., and means including said relay for including said source in said connection each time the voltage of said battery attains a predetermined value during a charging operation.

10. In a current supply system which is subject to high, medium and low load current demands during three different recurrent portions of successive twenty-four hour periods a storage battery, a connection for supplying current to the load from said battery, a circuit for testing the voltage of said battery, a charging circuit for said battery, said test circuit including a relay which is operative only when the voltage impressed on said test circuit attains a predetermined value, a cyclically operating control device operative through one complete cycle during each of said twenty-four hour periods, means controlled by said device for completing said charging circuit periodically at successively lower rates of periodicity during the high, medium and low load current demand periods, respectively, of each twenty-four hour period, means controlled by said device for periodically completing said test circuit at a substantially higher rate of periodicity, a source of counter E. M. F., and means responsive to successive operations of said relay for alternately including said source in said connection and interrupting said charging circuit.

11. In a current supply system, a battery, a connection for supplying current to a load from said battery, a charging circuit for said battery, means for periodically completing said charging circuit, a source of counter E. M. F., means for including said source in said connection each time the voltage of said battery rises to a predetermined value, and means for interrupting said charging circuit each time the voltage of said battery rises to a higher predetermined value.

12. In a current supply system which is subject to different load current demands during different recurrent portions of successive predetermined periods, a storage battery, a connection for supplying current to the load from said storage battery, a charging circuit for said battery, means for periodically completing said circuit at different rates of periodicity for the different portions of each predetermined period, a source of counter E. M. F., means for including said source in said connection each time the voltage of said battery rises to a predetermined value, and means for interrupting said charging circuit each time the voltage of said battery rises to a higher predetermined value.

13. In a current supply system which is subject to different load current demands during different portions of a predetermined first period, a storage battery for supplying at least a portion of the load current, a charging circuit for said battery, apparatus for periodically completing said circuit at different rates of periodicity during corresponding portions of a second period which is equal to said first period in length, and means for adjusting said apparatus so that said first and second periods start concurrently.

14. In a current supply system which is subject to different load current demands during different portions of a predetermined first period, a storage battery for supplying at least a portion of the load current, a charging circuit for said battery, apparatus for periodically completing said circuit at different rates of periodicity during corresponding portions of a second period which is equal to said first period in length and occurs in timed relationship to said first period, and means for adjusting said apparatus to change the timed relationship between said periods.

15. In a current supply system, a storage battery, a charging circuit for said battery, a start relay operative to complete said circuit, means including a control device for periodically energizing said start relay, means comprising a low voltage test relay for energizing said start relay independently of the operation of said control device each time the voltage of said battery drops below a predetermined value, and means for interrupting said charging circuit each time the voltage of said battery rises to a higher predetermined value.

16. In a current supply system, a storage battery, a source of alternating current, a charging circuit including a unit for converting alternating current derived from said source into direct current and for delivering the direct current to said battery, means including a control device and a group of inter-connected relays for periodically completing said circuit, means responsive to a failure of said alternating current source for opening said circuit and for deenergizing any operated ones of said relays, and means responsive to the subsequent restoration of said source for completing said circuit independently of the operation of said control device.

17. In a current supply system, a storage battery, a source of alternating current, a charging circuit including a unit for converting alternating current derived from said source into direct current and for delivering the direct current to said battery, means including a control device for periodically completing said circuit, means operative to interrupt said circuit in the event said alternating current source fails, and means operative automatically to complete said circuit independently of the operation of said control device when said source is subsequently restored.

CLARENCE H. LOMAX.
PIER BAUXNER.